(12) United States Patent
Nagura et al.

(10) Patent No.: US 11,079,071 B2
(45) Date of Patent: Aug. 3, 2021

(54) HYDROGEN STATION OPERATION METHOD AND HYDROGEN STATION

(71) Applicant: KOBE STEEL, LTD., Hyogo (JP)

(72) Inventors: Kenji Nagura, Takasago (JP); Tomohiro Ootsuka, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 63 days.

(21) Appl. No.: 16/586,055

(22) Filed: Sep. 27, 2019

(65) Prior Publication Data

US 2020/0182408 A1    Jun. 11, 2020

(30) Foreign Application Priority Data

Dec. 7, 2018  (JP) .............................. JP2018-229865

(51) Int. Cl.
*F17C 7/04*   (2006.01)
*F17C 13/02*  (2006.01)
(Continued)

(52) U.S. Cl.
CPC ................ *F17C 7/04* (2013.01); *B67D 7/048* (2013.01); *B67D 7/0492* (2013.01); *B67D 7/78* (2013.01);
(Continued)

(58) Field of Classification Search
CPC ............ F17C 2265/03–038; F17C 7/04; F17C 13/04; F17C 13/028; F17C 221/012; F17C 2227/0157; F17C 2227/0393; F17C 2227/0168; F17C 2227/0184; F17C 2250/0621; F17C 2250/0426; B67D 7/048; B67D 7/0492; B67D 7/78; B67D 7/80
See application file for complete search history.

(56) References Cited

U.S. PATENT DOCUMENTS 4,475,348 A * 10/1984 Remes ...................... F17C 9/00
                                                                        141/5
5,243,821 A *  9/1993 Schuck ..................... F17C 7/04
                                                                        62/50.6
(Continued)

FOREIGN PATENT DOCUMENTS

JP          2011001993 A      1/2011
JP          2012251606 A     12/2012

*Primary Examiner* — Andrew D Stclair
(74) *Attorney, Agent, or Firm* — Studebaker & Brackett PC

(57) ABSTRACT

A hydrogen station operation method capable of adjusting pressure in a reservoir to the pressure suitable for liquid hydrogen replenishment while cutting hydrogen waste is for replenishing liquid hydrogen into the reservoir in a hydrogen station including: a gasification path partially gasifying liquid hydrogen out of the reservoir and returning it; and a gas delivery path delivering gasified hydrogen in the reservoir into a path between a vaporizer and a compressor or the vaporizer, when the remainder of liquid hydrogen in the reservoir becomes a first threshold or less, by reducing the liquid hydrogen amount flowing through the gasification path by a valve therein, reducing the gasification amount of liquid hydrogen in the reservoir, and increasing the hydrogen gas amount delivered through the gas delivery path from the reservoir by a valve therein, pressure in the reservoir is reduced, thereby performing operation where suction pressure of the compressor is reduced.

7 Claims, 3 Drawing Sheets

(51) Int. Cl.
  *F17C 13/04* (2006.01)
  *B67D 7/04* (2010.01)
  *B67D 7/78* (2010.01)
  *B67D 7/80* (2010.01)

(52) U.S. Cl.
  CPC .............. *B67D 7/80* (2013.01); *F17C 13/028* (2013.01); *F17C 13/04* (2013.01); *F17C 2221/012* (2013.01); *F17C 2227/0157* (2013.01); *F17C 2227/0393* (2013.01); *F17C 2250/0426* (2013.01); *F17C 2250/0621* (2013.01); *F17C 2270/0168* (2013.01); *F17C 2270/0184* (2013.01)

(56) References Cited

U.S. PATENT DOCUMENTS

| | | | | |
|---|---|---|---|---|
| 5,590,535 | A * | 1/1997 | Rhoades | F17C 9/02 62/50.2 |
| 5,671,603 | A * | 9/1997 | McCorkle | F17C 13/021 62/49.2 |
| 5,771,946 | A * | 6/1998 | Kooy | F17C 6/00 141/82 |
| 6,755,225 | B1 * | 6/2004 | Niedwiecki | B60P 3/14 141/231 |
| 10,088,108 | B2 * | 10/2018 | Jansson | F17C 5/02 |
| 2015/0153005 | A1 * | 6/2015 | Takano | F17C 5/007 141/4 |

* cited by examiner

F I G. 1
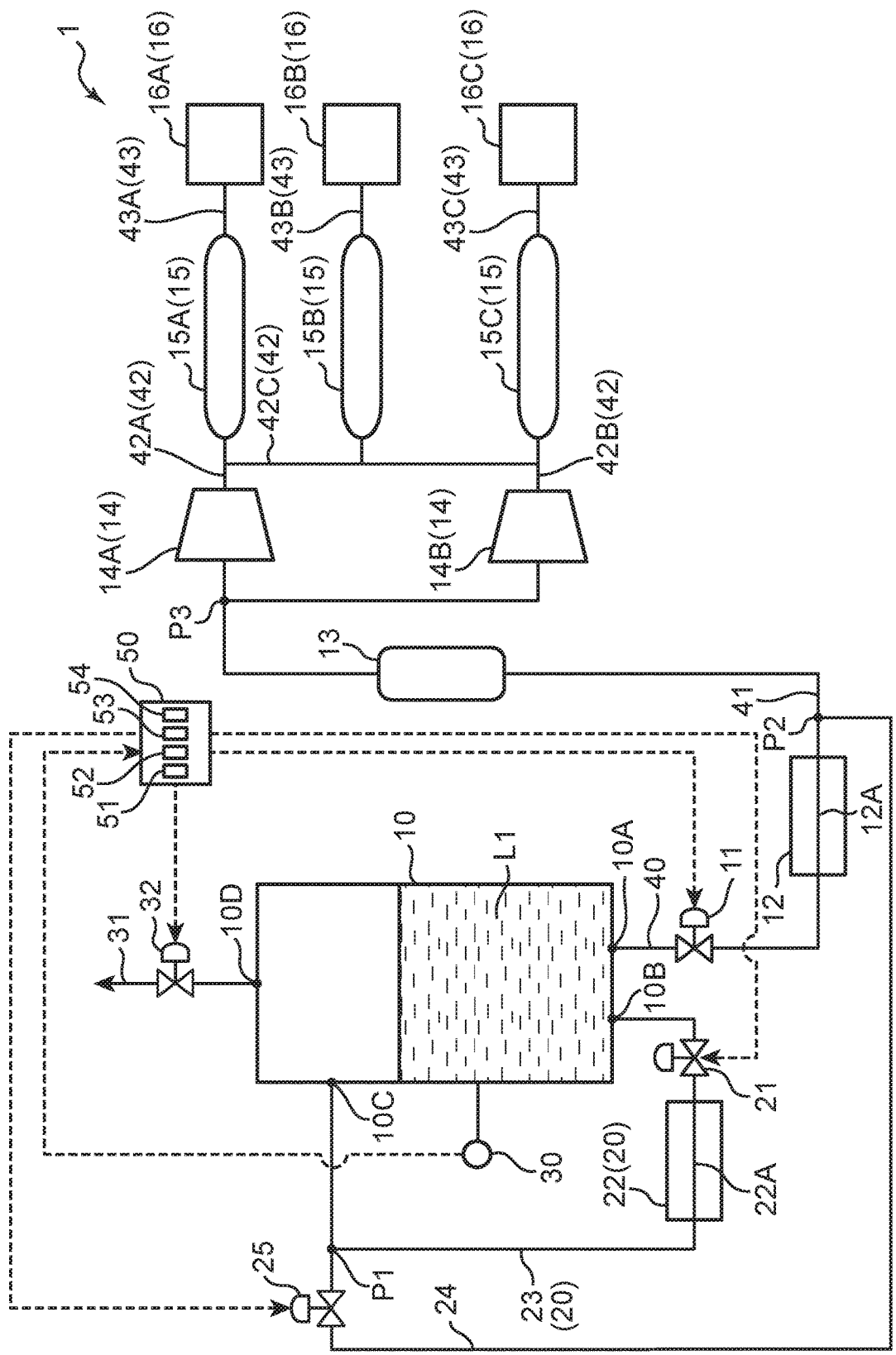

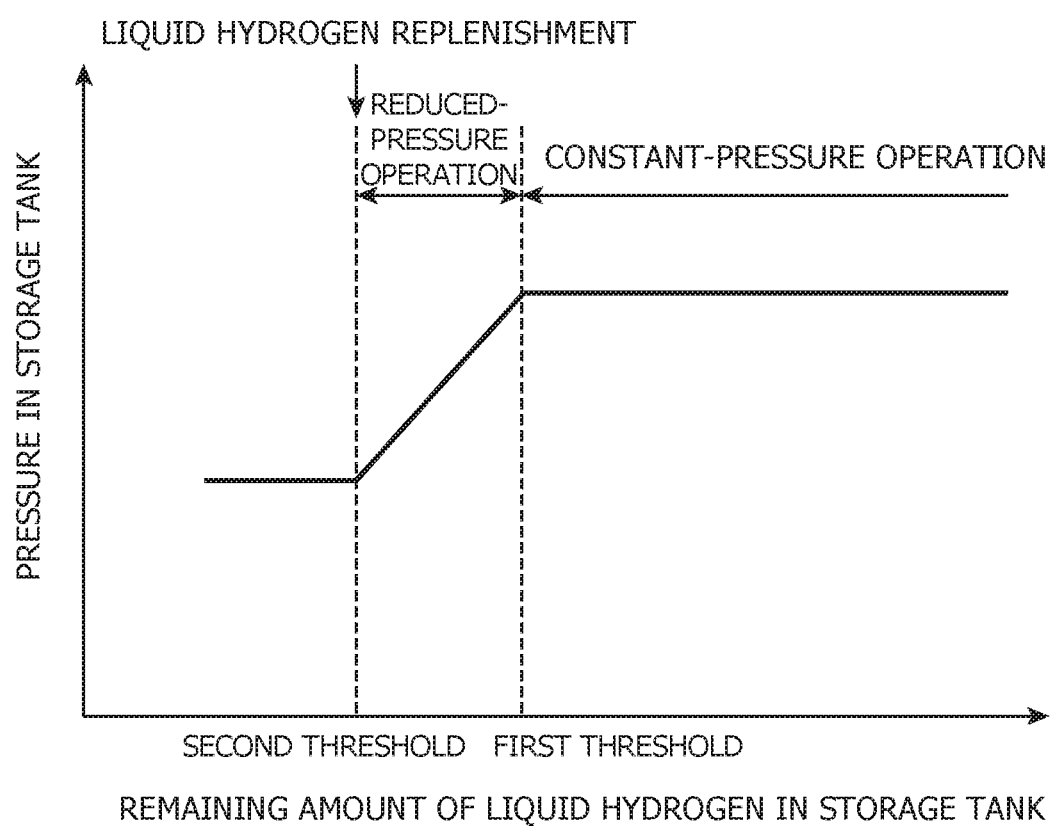

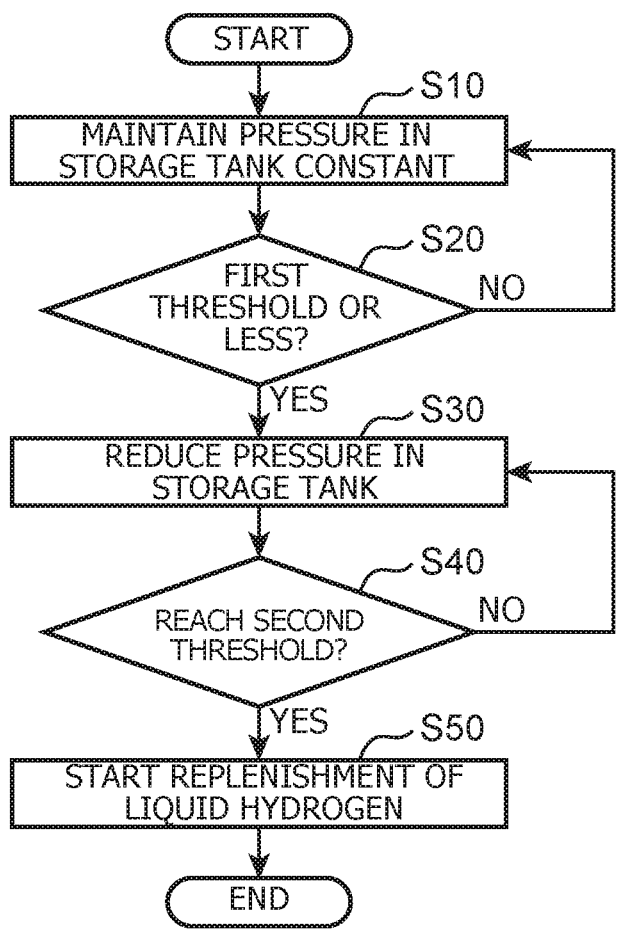

HYDROGEN STATION OPERATION METHOD AND HYDROGEN STATION

BACKGROUND OF THE INVENTION

Field of the Invention

The present invention relates to a hydrogen station operation method and a hydrogen station.

Description of the Related Art

Conventionally, a hydrogen station which is a facility for filling a fuel cell vehicle with hydrogen gas which is a fuel is known. In the hydrogen station, a storage tank for storing hydrogen in a liquid state before gasification (liquid hydrogen) is provided, the liquid hydrogen taken out from the storage tank is gasified, the hydrogen gas is increased in pressure to a predetermined pressure by a compressor, and thereafter can be filled into the fuel cell vehicle from a dispenser.

In JP 2011-1993 A and JP 2012-251606 A, such a storage tank for storing liquid hydrogen is disclosed. In the storage tank disclosed in these publications, a pressure relief path for discharging hydrogen gas within the storage tank to the outside is provided, and pressure in the storage tank can be adjusted by opening a pressure relief valve provided in the path.

When the amount of liquid hydrogen in the storage tank is decreased in association with the filling of hydrogen gas into the fuel cell vehicle, the need to replenish the storage tank with liquid hydrogen from a tank lorry or the like arises. In JP 2011-1993 A and JP 2012-251606 A, in a case where the remaining amount of liquid hydrogen in the storage tank is decreased and replenishment of liquid hydrogen is required, the pressure in the storage tank may be reduced to the pressure suitable for replenishment of liquid hydrogen by discharging (purging) hydrogen gas within the storage tank to the outside of a hydrogen station through the pressure relief path. In this case, there is a problem in that waste of hydrogen is increased due to purge of hydrogen gas.

The present invention has been made in view of the above-described problem, and an object thereof is to provide a hydrogen station operation method and a hydrogen station capable of adjusting the pressure in a storage tank to the pressure suitable for replenishment of liquid hydrogen while cutting waste of hydrogen.

A hydrogen station operation method according to one aspect of the present invention is a method for replenishing liquid hydrogen into a storage tank in a hydrogen station which includes: the storage tank which stores the liquid hydrogen; a vaporizer which gasifies the liquid hydrogen supplied from the storage tank; a compressor which increases the pressure of the hydrogen gasified in the vaporizer to a predetermined pressure; a gasification path which gasifies at least a part of the liquid hydrogen flowed out of the storage tank and returns it to the storage tank; a gas delivery path for delivering the gasified hydrogen in the storage tank to a path between the vaporizer and the compressor, or into the vaporizer; and an accumulator which stores the hydrogen gas increased in pressure in the compressor, and fills a tank loading device with the hydrogen gas stored in the accumulator via a dispenser. In the method, when the remaining amount of the liquid hydrogen in the storage tank becomes equal to or less than a first threshold before replenishing the liquid hydrogen into the storage tank, by reducing the amount of the liquid hydrogen flowing through the gasification path by a valve arranged in the gasification path, reducing the gasification amount of the liquid hydrogen in the storage tank, and further increasing the amount of hydrogen gas delivered through the gas delivery path from the storage tank by a valve arranged in the gas delivery path, the pressure in the storage tank is reduced, thereby performing the operation in which a suction pressure of the compressor is reduced.

In the method, when the remaining amount of the liquid hydrogen in the storage tank becomes equal to or less than the first threshold, by reducing the amount of the liquid hydrogen flowing through the gasification path by the valve, reducing the gasification amount of the liquid hydrogen in the storage tank, and further increasing the amount of hydrogen gas delivered to the path between the vaporizer and the compressor (or into the vaporizer) through the gas delivery path from the storage tank by the valve, the pressure in the storage tank can be reduced before replenishment of the liquid hydrogen. Therefore, unlike the method of reducing the pressure in the storage tank only by the method of discharging (purging) hydrogen gas in the storage tank to the outside, the pressure in the storage tank can be reduced to the pressure suitable for replenishment of liquid hydrogen while suppressing a decrease in the hydrogen amount in the storage tank. That is, the pressure in the storage tank can be reduced while suppressing the amount of hydrogen in the storage tank to be discharged to the outside, and therefore it is possible to efficiently replenish liquid hydrogen into the storage tank while cutting waste of hydrogen.

A hydrogen station operation method according to another aspect of the present invention is a method for replenishing liquid hydrogen into a storage tank in a hydrogen station which includes: the storage tank which stores the liquid hydrogen; a vaporizer which gasifies the liquid hydrogen supplied from the storage tank; a compressor which increases the pressure of the hydrogen gasified in the vaporizer to a predetermined pressure; a gas delivery path for delivering the gasified hydrogen in the storage tank to a path between the vaporizer and the compressor, or into the vaporizer; and an accumulator which stores the hydrogen gas increased in pressure in the compressor, and fills a tank loading device with the hydrogen gas stored in the accumulator via a dispenser. In the method, when the remaining amount of the liquid hydrogen in the storage tank becomes equal to or less than a first threshold before replenishing the liquid hydrogen into the storage tank, the pressure in the storage tank is reduced by increasing the amount of hydrogen gas delivered through the gas delivery path from the storage tank by a valve arranged in the gas delivery path, thereby performing the operation in which a suction pressure of the compressor is reduced.

In the method, when the remaining amount of the liquid hydrogen in the storage tank becomes equal to or less than the first threshold, by increasing the amount of hydrogen gas delivered to the path between the vaporizer and the compressor (or into the vaporizer) through the gas delivery path from the storage tank by the valve, the pressure in the storage tank can be reduced before replenishment of the liquid hydrogen. Therefore, unlike the method of reducing the pressure in the storage tank only by the method of discharging (purging) hydrogen gas in the storage tank to the outside, the pressure in the storage tank can be reduced to the pressure suitable for replenishment of liquid hydrogen while suppressing the amount of hydrogen gas to be discharged to the outside of the hydrogen station. Thereby, it is possible to efficiently replenish liquid hydrogen into the storage tank while cutting waste of hydrogen.

In the hydrogen station operation method, until the remaining amount of the liquid hydrogen in the storage tank reaches a second threshold smaller than the first threshold from the first threshold, the pressure in the storage tank is gradually reduced, and based on the fact that the remaining amount of the liquid hydrogen in the storage tank reached the second threshold, replenishment of the liquid hydrogen into the storage tank may be started.

According to the method, before replenishment of liquid hydrogen into the storage tank is required (before the remaining amount of the liquid hydrogen in the storage tank reaches the second threshold), the pressure in the storage tank can be gradually reduced. Thereby, at the time when the remaining amount of the liquid hydrogen in the storage tank reaches the second threshold, the pressure in the storage tank can be in a state of being reduced enough to perform replenishment of liquid hydrogen, and therefore it is possible to immediately perform replenishment of liquid hydrogen.

In the hydrogen station operation method, the tank loading device may be a fuel cell forklift or a fuel cell vehicle.

In the hydrogen station which refuels the fuel cell forklift or the fuel cell vehicle, by reducing the pressure in the storage tank while suppressing the amount of hydrogen gas in the storage tank to be discharged to the outside of the hydrogen station, it is possible to efficiently replenish liquid hydrogen into the storage tank while cutting waste of hydrogen.

In the hydrogen station operation method, in the hydrogen station, a plurality of the dispensers may be provided so as to be able to fill each of the fuel cell forklift and the fuel cell vehicle with hydrogen gas.

In this way, also in the hydrogen station provided with different dispensers corresponding to a plurality of types of vehicle, it is possible to efficiently replenish liquid hydrogen into the storage tank while cutting waste of hydrogen.

A hydrogen station according to still another aspect of the present invention includes: a storage tank which stores liquid hydrogen; a vaporizer which gasifies the liquid hydrogen supplied from the storage tank; a compressor which increases the pressure of the hydrogen gasified in the vaporizer to a predetermined pressure; a gasification path which gasifies at least a part of the liquid hydrogen flowed out of the storage tank and returns it to the storage tank; a gasification valve which is arranged in the gasification path and adjusts the amount of the liquid hydrogen flowing through the gasification path; a gas delivery path for delivering the gasified hydrogen in the storage tank to a path between the vaporizer and the compressor, or into the vaporizer; an accumulator which stores the hydrogen gas increased in pressure in the compressor; a liquid amount detection unit which detects the remaining amount of the liquid hydrogen in the storage tank; and a control unit which, when the remaining amount of the liquid hydrogen in the storage tank detected by the liquid amount detection unit becomes equal to or less than a first threshold, controls the gasification valve so as to reduce the amount of the liquid hydrogen flowing through the gasification path and reduce the gasification amount of the liquid hydrogen in the storage tank, and further controls a valve arranged in the gas delivery path so as to increase the amount of hydrogen gas delivered through the gas delivery path from the storage tank.

In the hydrogen station, when the liquid amount detection unit detects that the remaining amount of the liquid hydrogen in the storage tank became equal to or less than the first threshold, the amount of hydrogen gas returning to the storage tank is reduced by reducing the amount of the liquid hydrogen flowing through a heat exchanger in the gasification path by control of the gasification valve, and the amount of hydrogen gas delivered to the path between the vaporizer and the compressor (or into the vaporizer) through the gas delivery path from the storage tank is increased by the valve, thereby capable of reducing the gasification amount of the liquid hydrogen in the storage tank. Therefore, unlike in the case where the pressure in the storage tank is reduced only by discharging hydrogen gas in the storage tank to the outside, the pressure in the storage tank can be easily reduced to the pressure suitable for replenishment of liquid hydrogen while suppressing a decrease in the hydrogen amount in the storage tank. That is, the pressure in the storage tank can be reduced while suppressing the amount of hydrogen in the storage tank to be discharged to the outside, and therefore it is possible to efficiently replenish liquid hydrogen into the storage tank while cutting waste of hydrogen.

A hydrogen station according to yet another aspect of the present invention includes: a storage tank which stores liquid hydrogen; a vaporizer which gasifies the liquid hydrogen supplied from the storage tank; a compressor which increases the pressure of the hydrogen gasified in the vaporizer to a predetermined pressure; a gas delivery path for delivering the gasified hydrogen in the storage tank to a path between the vaporizer and the compressor, or into the vaporizer; a gas delivery valve which is arranged in the gas delivery path and adjusts the amount of hydrogen gas flowing through the gas delivery path; an accumulator which stores the hydrogen gas increased in pressure in the compressor; a liquid amount detection unit which detects the remaining amount of the liquid hydrogen in the storage tank; and a control unit which, when the remaining amount of the liquid hydrogen in the storage tank detected by the liquid amount detection unit becomes equal to or less than a first threshold, controls the gas delivery valve so as to increase the amount of hydrogen gas flowing through the gas delivery path.

In the hydrogen station, when the liquid amount detection unit detects that the remaining amount of the liquid hydrogen in the storage tank became equal to or less than the first threshold, by increasing the amount of hydrogen gas flowing through the gas delivery path by the gas delivery valve, the amount of hydrogen gas in the storage tank can be reduced. Therefore, unlike in the case where the pressure in the storage tank is reduced only by discharging hydrogen gas in the storage tank to the outside of the hydrogen station, the pressure in the storage tank can be reduced to the pressure suitable for replenishment of liquid hydrogen while cutting waste of hydrogen.

In the hydrogen station, the control unit may control the gasification valve in such a manner that the pressure in the storage tank is gradually reduced until the remaining amount of the liquid hydrogen in the storage tank detected by the liquid amount detection unit reaches a second threshold which is a value smaller than the first threshold and which requires replenishment of the liquid hydrogen from the first threshold.

According to the configuration, at the time when the remaining amount of the liquid hydrogen in the storage tank reaches the second threshold, the pressure in the storage tank can be in a state of being reduced enough to perform replenishment of liquid hydrogen, and therefore it is possible to immediately perform replenishment of liquid hydrogen.

The hydrogen station may further include a plurality of dispensers for filling tank loading devices with hydrogen gas stored in the accumulator, provided so as to be able to fill each of a fuel cell forklift and a fuel cell vehicle which are the tank loading devices with hydrogen gas.

According to the configuration, also in the hydrogen station provided with different dispensers corresponding to a plurality of types of vehicle, by reducing the pressure in the storage tank while suppressing the amount of hydrogen in the storage tank to be discharged to the outside of the hydrogen station, it is possible to efficiently replenish liquid hydrogen into the storage tank while cutting waste of hydrogen.

As is apparent from the above description, according to the present invention, it is possible to provide a hydrogen station operation method and a hydrogen station capable of adjusting the pressure in a storage tank to the pressure suitable for replenishment of liquid hydrogen while cutting waste of hydrogen.

BRIEF DESCRIPTION OF THE DRAWINGS

FIG. 1 is a view schematically showing the configuration of a hydrogen station according to a first embodiment of the present invention.

FIG. 2 is a graph showing a relationship between the remaining amount of liquid hydrogen in a storage tank and the pressure in the storage tank, in a hydrogen station operation method according to the first embodiment of the present invention.

FIG. 3 is a flow chart showing the flow of the hydrogen station operation method.

DESCRIPTION OF THE PREFERRED EMBODIMENTS

Hereinafter, a hydrogen station and an operation method thereof according to embodiments of the present invention will be described in detail based on the drawings.

First Embodiment

First, the configuration of a hydrogen station 1 according to a first embodiment of the present invention will be described with reference to FIG. 1. FIG. 1 schematically shows main components of the hydrogen station 1.

The hydrogen station 1 is a facility for filling a fuel cell (FC) forklift and an FC vehicle which are tank loading devices with hydrogen gas which is a fuel. As shown in FIG. 1, the hydrogen station 1 mainly includes a storage tank 10, a vaporizer 12, a first path 40 which connects the storage tank 10 and the vaporizer 12, a liquid delivery valve 11 arranged in the first path 40, a gasification path 20, a gasification valve 21 arranged in the gasification path 20, a compressor 14, a second path 41 which connects the vaporizer 12 and the compressor 14, a buffer tank 13 provided in the second path 41, a gas delivery path 24 which connects the gasification path 20 and the second path 41, a gas delivery valve 25 arranged in the gas delivery path 24, an accumulator 15, and a control unit 50. Hereinafter, these components will be described respectively.

The storage tank 10 is for storing liquid hydrogen L1, and has a dual structure formed with a vacuum insulation layer in the inside thereof. The storage tank 10 has a first circulation port 10A for allowing the liquid hydrogen L1 to flow out to a demander, a second circulation port 10B for allowing the liquid hydrogen L1 to flow out for generation of hydrogen gas which pressurizes the inside of the storage tank 10, a third circulation port 10C for allowing the gasified hydrogen (hydrogen gas) to flow into the storage tank 10, and a fourth circulation port 10D for discharging (purging) the hydrogen gas in the storage tank 10 to the outside. As shown in FIG. 1, the first and the second circulation ports 10A, 10B are provided in the bottom of the storage tank 10, the third circulation port 10C is provided in the upper side part (the upper side than the liquid level of the liquid hydrogen L1), and the fourth circulation port 10D is provided in the top (the upper side than the liquid level of the liquid hydrogen L1) of the storage tank 10. In addition, the positions of the first to the fourth circulation ports 10A to 10D are not particularly limited.

In the storage tank 10, a liquid amount detection unit 30 which detects the remaining amount of the liquid hydrogen L1 in the storage tank 10 is provided. The liquid amount detection unit 30 is configured by, for example, a level sensor, and detects the liquid level height of the liquid hydrogen L1 in the storage tank 10. The liquid amount detection unit 30 is configured communicably with the control unit 50, and sends the detected data on the remaining amount of the liquid hydrogen L1 in the storage tank 10 to the control unit 50. In addition, the liquid amount detection unit in the hydrogen station of the present invention is only necessary to be configured so as to be able to detect the remaining amount of the liquid hydrogen L1 in the storage tank 10, and it is not limited to the level sensor.

Moreover, in the storage tank 10, a pressure detection unit (not shown) which detects the pressure in the storage tank 10 is provided. As with the liquid amount detection unit 30, the pressure detection unit also is configured communicably with the control unit 50, and sends the detected data on the pressure in the storage tank 10 to the control unit 50. In addition, the pressure detection unit is not an essential component in the hydrogen station of the present invention, and may be omitted.

In order to deliver hydrogen from the storage tank 10 to the demander, the first path 40 is configured by a pipe through which the liquid hydrogen L1 flowed out of the storage tank 10 (the first circulation port 10A) can circulate. In the first path 40, the liquid delivery valve 11 which adjusts the amount of the liquid hydrogen L1 flowing through the first path 40 is arranged. The first path 40 is connected to the first circulation port 10A at an upstream end thereof and is connected to an inlet of the vaporizer 12 at a downstream end thereof. Thereby, the liquid hydrogen L1 flowed out of the storage tank 10 through the first circulation port 10A can be delivered to the vaporizer 12 via the first path 40.

The gasification path 20 is a path for gasifying at least a part of the liquid hydrogen L1 flowed out of the storage tank 10 (the second circulation port 10B) and returning it to the storage tank 10. The gasification path 20 includes a heat exchanger 22, and a heat exchange line 23 in which the heat exchanger 22 is arranged. As shown in FIG. 1, the heat exchange line 23 is connected to the third circulation port 10C of the storage tank 10 at one end (a downstream end) thereof.

The heat exchanger 22 gasifies the liquid hydrogen L1 by the heat of heat source fluid such as atmosphere or the like. Specifically, the heat exchanger 22 has a flow path 22A having a configuration by which heat is easily input to the liquid hydrogen L1 from the outside by a plate fin or the like. According to the heat exchanger 22, by exchanging heat between the liquid hydrogen L1 flowing through the flow path 22A and atmosphere (air), at least a part of the liquid hydrogen L1 can be gasified. The liquid hydrogen L1 flowing into the heat exchanger 22 may be gasified in whole, or a part thereof as in a liquid state may be flowed out of the heat exchanger 22. Further, the heat exchanger 22 may be the one (not shown) provided with a flow path of heat source fluid whose heat source is gas other than air or liquid such as a double pipe or plate heat exchanger, and is not particularly limited.

According to the gasification path 20, the liquid hydrogen L1 flowed out of the storage tank 10 (the second circulation port 10B) is passed through the heat exchanger 22 and gasified, and thereafter can be returned into the storage tank 10 from the third circulation port 10C. As mentioned above, in the present embodiment, the third circulation port 10C is located on the upper side than the liquid level of the liquid hydrogen L1 in the storage tank 10, and therefore hydrogen gas is discharged from the third circulation port 10C toward the top space (gas space) in the storage tank 10. In addition, the gasification path 20 is not limited to the mode in which the liquid hydrogen L1 is gasified by the heat exchanger 22.

The gasification valve 21 is for adjusting the flow rate of the liquid hydrogen L1 flowing through the gasification path 20, and is arranged on the upstream side than the heat exchanger 22 in the flow direction of hydrogen as shown in FIG. 1. The gasification valve 21 is configured so as to be able to adjust the opening thereof by the control unit 50, and controls the flow rate of the liquid hydrogen L1 flowing through the gasification path 20 by the opening. That is, the inflow of the liquid hydrogen L1 to the gasification path 20 can be blocked by closing the gasification valve 21, and the inflow of the liquid hydrogen L1 to the gasification path 20 can be permitted by opening the gasification valve 21. Then, the inflow amount of the liquid hydrogen L1 to the gasification path 20 can be adjusted by the opening of the gasification valve 21.

The gas delivery path 24 is for delivering the gasified hydrogen in the storage tank 10 (the hydrogen gas accumulated in the top space in the storage tank 10) and the gasified hydrogen in the heat exchanger 22 to the path (the second path 41) between the vaporizer 12 and the compressor 14. As shown in FIG. 1, the gas delivery path 24 is branched off from a region P1 on the downstream side than the heat exchanger 22 in the heat exchange line 23, and is joined with a region P2 in the second path 41 (the path on the downstream side of the vaporizer 12). In the middle of the gas delivery path 24, the gas delivery valve 25 is arranged, and by opening the gas delivery valve 25, the hydrogen gas accumulated in the top space in the storage tank 10 can be delivered to the demander. Moreover, by the opening of the gas delivery valve 25, the amount of hydrogen gas flowing through the gas delivery path 24 is adjusted. In addition, the upstream end of the gas delivery path 24 may be connected to a purge path 31. Moreover, the region P2 may be joined with the middle of a first flow path 12A of the vaporizer 12.

To the fourth circulation port 10D in the storage tank 10, the purge path 31 for discharging hydrogen gas in the storage tank 10 to the outside is connected. As shown in FIG. 1, in the purge path 31, a purge valve 32 which switches circulation and interception of hydrogen gas is arranged. The purge valve 32 is controlled in its opening/closing by the control unit 50. By opening the purge valve 32, hydrogen gas in the storage tank can be released to the outside.

The vaporizer 12 is arranged in a latter stage of the storage tank 10, and is for gasifying the liquid hydrogen L1 supplied from the storage tank 10. As shown in FIG. 1, the vaporizer 12 has the first flow path 12A connected to the first path 40 and having a configuration by which heat is easily input from the outside by a plate fin or the like, and can gasify the liquid hydrogen L1 by exchanging heat between the liquid hydrogen L1 flowing through the first flow path 12A and heat source fluid such as atmosphere (air) or the like. In addition, as with the heat exchanger 22, the vaporizer 12 may be the one (not shown) provided with a flow path of heat source fluid whose heat source is gas other than air or liquid such as a double pipe or plate heat exchanger, and is not particularly limited.

Hydrogen (hydrogen gas) gasified in the vaporizer 12 is directed to the compressor 14 through the second path 41. That is, the second path 41 is for delivering hydrogen gas from the vaporizer 12 to the compressor 14, and is a low-pressure gas path through which hydrogen gas before pressure rising by the compressor 14 flows. Moreover, as shown in FIG. 1, to the second path 41, the downstream end of the gas delivery path 24 is connected.

In the second path 41, the buffer tank 13 is provided, and can store hydrogen gas temporarily before supply to the compressor 14. By the buffer tank 13, for example, even if the amount of hydrogen gas to be delivered from the storage tank 10 side and the amount of hydrogen gas the compressor 14 suctions are not balanced temporarily, fluctuation of the supply pressure of hydrogen gas to the compressor 14 can be mitigated.

The compressor 14 is arranged in a latter stage of the vaporizer 12 and the buffer tank 13, and increases the pressure of the hydrogen gasified in the vaporizer 12 to a predetermined pressure (for example, 40 MPa). As shown in FIG. 1, in the present embodiment, a plurality of (two) compressors 14 (a first compressor 14A, a second compressor 14B) are respectively provided. The second path 41 is branched into paths in the number (two in the present embodiment) corresponding to the number of the compressors 14 at a region P3 on the downstream side than the buffer tank 13, and the respective branched paths are connected respectively to suction ports of the compressors 14. Thereby, the hydrogen gas diverged at the region P3 after flowing out of the buffer tank 13 can be supplied to each of the first compressor 14A and the second compressor 14B. In addition, in the hydrogen station of the present invention, the compressor may increase the pressure to more than 80 MPa. The hydrogen station is not limited to the one in which a plurality of compressors are arranged, and may be the one in which only one compressor is arranged.

The compressor 14 is, for example, a reciprocating compressor, and increases the pressure of the hydrogen gas suctioned in a cylinder by reciprocating motion of a piston and discharges the hydrogen gas increased in pressure. Here, in the hydrogen station 1 according to the present embodiment, the pressure is approximately constant in a range from the storage tank 10 to the suction port of the compressor 14 as will be described later. Therefore, the pressure in the storage tank 10 corresponds approximately to the suction pressure of the compressor 14. In addition, the compressor 14 is not limited to the reciprocating compressor, and may be, for example, a screw compressor. Further, the compressor 14 may be configured so as to increase the pressure in two or more stages by any combination of these compressors (for example, a screw compressor is on the low-stage side, and a reciprocating compressor is on the high-stage side).

The accumulator 15 is arranged in a latter stage of the compressor 14, and temporarily stores the hydrogen gas increased in pressure by the compressor 14. As shown in FIG. 1, in the present embodiment, a plurality of (three) accumulators 15 (a first accumulator 15A, a second accumulator 15B, a third accumulator 15C) are respectively provided. The respective accumulators 15 are designed so as to withstand the pressure of the hydrogen gas after pressure rising by the compressor 14. In addition, in the hydrogen station of the present invention, a plurality of accumulators may accumulate pressure at different pressures according to the supply destinations, and the hydrogen station is not limited to the one in which a plurality of accumulators are arranged and may be the one in which only one accumulator is arranged.

The accumulator 15 is connected to the compressor 14 by a third path 42. As shown in FIG. 1, the third path 42 has a first path portion 42A which connects a discharge port of the first compressor 14A and an inlet of the first accumulator 15A, a second path portion 42B which connects a discharge port of the second compressor 14B and an inlet of the third accumulator 15C, and a third path portion 42C which connects the first path portion 42A and the second path portion 42B and is connected to an inlet of the second accumulator 15B. By this path configuration, the hydrogen gas increased in pressure by the first compressor 14A can be allowed to flow into each of the first to the third accumulators 15A to 15C, and the hydrogen gas increased in pressure by the second compressor 14B can be allowed to flow into each of the first to the third accumulators 15A to 15C. In addition, the compressor 14 and the accumulator 15 may be accommodated in one unit housing.

In a latter stage of the accumulator 15, a dispenser 16 for filling the high-pressure hydrogen gas stored in the accumulator 15 into a fuel cell loading vehicle (a tank loading device) such as an FC forklift, an FC vehicle or the like is arranged. As shown in FIG. 1, in the present embodiment, the dispensers 16 (a first dispenser 16A, a second dispenser 16B, a third dispenser 16C) in the same number as the accumulators 15 are respectively provided. In addition, the present invention is not limited to the case where a plurality of dispensers 16 are arranged, and only one dispenser 16 may be arranged.

The dispenser 16 is connected to the accumulator 15 by a fourth path 43. Specifically, the fourth path 43 has a first path portion 43A which connects an outlet of the first accumulator 15A and an inlet of the first dispenser 16A, a second path portion 43B which connects an outlet of the second accumulator 15B and an inlet of the second dispenser 16B, and a third path portion 43C which connects an outlet of the third accumulator 15C and an inlet of the third dispenser 16C. Thereby, the hydrogen gas flowed out of the one accumulator 15 can be supplied to the one dispenser 16.

The dispenser 16 has, for example, a nozzle insertable into a supply port of an FC forklift or an FC vehicle. Here, the types of the nozzle may be respectively different with respect to each of the first to the third dispensers 16A to 16C according to the types of vehicle such as an FC forklift and an FC vehicle.

The control unit 50 is, for example, configured by a personal computer, and is configured so as to receive the detected data by the liquid amount detection unit 30 and the detected data by the pressure detection unit (not shown) and control each opening of the liquid delivery valve 11, the gasification valve 21, the gas delivery valve 25 and the purge valve 32. Specifically, the control unit 50 has an opening control unit 51 which controls each opening of the liquid delivery valve 11, the gasification valve 21, the gas delivery valve 25 and the purge valve 32, a receiving unit 52 which receives the detected data from the liquid amount detection unit 30 and the pressure detection unit, a memory unit 53 which stores the thresholds previously determined relating to the remaining amount of the liquid hydrogen L1 in the storage tank 10 and the set value relating to the delivery pressure of the liquid hydrogen L1 from the storage tank 10 (the pressure in the top space in the storage tank 10), and a comparison unit 54 which compares the detected data received by the receiving unit 52 and the thresholds and the set value stored in the memory unit 53. The control unit 53 stores the threshold (a second threshold) at which replenishment of the liquid hydrogen L1 into the storage tank 10 is required, the threshold (a first threshold) larger than the former threshold, and the set value of the delivery pressure of the liquid hydrogen L1 from the storage tank 10. In addition, each of the opening control unit 51, the receiving unit 52, the memory unit 53 and the comparison unit 54 is one function of a CPU (Central Processing unit) of the personal computer constituting the control unit 50.

The control unit 50, when the remaining amount of the liquid hydrogen L1 in the storage tank 10 detected by the liquid amount detection unit 30 becomes equal to or less than the first threshold, controls the gasification valve 21 so as to reduce the amount of the liquid hydrogen L1 flowing through the gasification path 20 and reduce the gasification amount of the liquid hydrogen L1 in the storage tank 10 (reduces the opening of the gasification valve 21). Further, the control unit 50, when the remaining amount of the liquid hydrogen L1 in the storage tank 10 detected by the liquid amount detection unit 30 becomes equal to or less than the first threshold, controls the gas delivery valve 25 so as to increase the amount of hydrogen gas flowing through the gas delivery path 24 (increases the opening of the gas delivery valve 25). In this case, the amount of hydrogen gas delivered to the second path 41 through the gas delivery path 24 from the inside of the storage tank 10 is increased, and therefore the discharge pressure of the liquid hydrogen L1 from the storage tank 10 (the pressure in the top space in the storage tank 10) is decreased.

In this manner, the pressure in the storage tank 10 can be reduced while suppressing the hydrogen amount to be discharged to the outside through the purge path 31 from the storage tank 10. In the present embodiment, the control unit 50, until the remaining amount of the liquid hydrogen L1 in the storage tank 10 detected by the liquid amount detection unit 30 reaches the second threshold from the first threshold, controls the openings of the gasification valve 21 and the gas delivery valve 25 so that the pressure in the storage tank 10 is gradually decreased. When the remaining amount of the liquid hydrogen L1 in the storage tank 10 detected by the liquid amount detection unit 30 becomes equal to or less than the first threshold, the ratio of the hydrogen gas flowing into the second path 41 from the gas delivery path 24 among the hydrogen gas flowing through the second path 41 may be larger than the ratio of the hydrogen gas flowing into the second path 41 from the vaporizer 12.

In the hydrogen station 1 according to the present embodiment, as mentioned above, in association with the remaining amount of the liquid hydrogen L1 in the storage tank 10, it is important in that the pressure in the storage tank 10 is controlled by the gasification valve 21, the gas delivery valve 25 and the liquid delivery valve 11, and the details thereof will be described in a hydrogen station operation method according to the present embodiment described later.

Next, a hydrogen station operation method according to the present embodiment will be described. The method is a method for replenishing the liquid hydrogen L1 into the storage tank 10 in the hydrogen station 1 described above. In the method, as described below, constant-pressure operation of maintaining the pressure in the storage tank 10 constant, reduced-pressure operation of gradually reducing the pressure in the storage tank 10 after the constant-pressure operation, and replenishment of liquid hydrogen after the reduced-pressure operation are performed sequentially.

FIG. 2 shows a relationship between the remaining amount of the liquid hydrogen L1 in the storage tank 10 (the horizontal axis) and the pressure in the storage tank 10 (the vertical axis) during the practice of the method. As shown in FIG. 2, until the remaining amount of the liquid hydrogen L1 in the storage tank 10 reaches the first threshold from the state more than the first threshold, the constant-pressure operation is performed. Subsequently, until the remaining amount of the liquid hydrogen L1 in the storage tank 10 reaches the second threshold from the first threshold, the reduced-pressure operation is performed. Then, based on the fact that the remaining amount of the liquid hydrogen L in the storage tank 10 reached the second threshold, replenishment of the liquid hydrogen L1 into the storage tank 10 is started. Hereinafter, referring to the graph in FIG. 2 and the flow chart in FIG. 3, the hydrogen station operation method according to the present embodiment will be described.

First, in the constant-pressure operation, the control unit 50 controls each opening of the gasification valve 21, the gas delivery valve 25 and the liquid delivery valve 11 in such a manner that the pressure of hydrogen gas in the storage tank 10 is maintained constant at the set value (for example, 0.5 to 0.7 MPa) (S10: FIG. 3).

Specifically, the liquid hydrogen L1 flows out of the storage tank 10 by supply of hydrogen gas to the accumulator 15 side, and accordingly the volume of the gas space (the space occupied by hydrogen gas) in the storage tank 10 is increased and the pressure in the storage tank 10 is decreased. In response, the hydrogen amount gasified in the heat exchanger 22 is increased by increasing the opening of the gasification valve 21. As a result, the amount of hydrogen gas returned to the storage tank 10 through the heat exchange line 23 is increased, and therefore even if the amount of the liquid hydrogen L1 in the storage tank 10 is decreased, the pressure in the storage tank 10 can be maintained constant. Moreover, at this time, the opening of the gas delivery valve 25 and the liquid delivery valve 11 may be also controlled at the same time. Thereby, among the hydrogen gas supplied to the demander, while changing the ratio of the hydrogen gas vaporized in the vaporizer 12 after being delivered as the liquid hydrogen L1 from the storage tank 10 and the hydrogen gas delivered as hydrogen gas from the storage tank 10, the pressure in the storage tank 10 can be maintained approximately constant. Moreover, if the pressure in the storage tank 10 is too increased, by opening the purge valve 32 and discharging the hydrogen gas in the storage tank 10 to the outside, the pressure in the storage tank 10 can also be maintained constant.

In this way, by controlling the gasification valve 21, the gas delivery valve 25, the liquid delivery valve 11 and the purge valve 32, the pressure of hydrogen gas in the storage tank 10 can be maintained constant. Moreover, as mentioned above, the buffer tank 13 is provided in a former stage of the compressor 14, and by the buffer tank 13, pressure fluctuation of the hydrogen gas suctioned in the compressor 14 is mitigated.

In the constant-pressure operation, the liquid amount detection unit 30 continuously detects the remaining amount of the liquid hydrogen L1 in the storage tank 10, and sends the detected data to the control unit 50 (the receiving unit 52). Then, the control unit 50 (the comparison unit 54) determines whether or not the detected data is equal to or less than the first threshold (S20: FIG. 3). If the detected data is larger than the first threshold (NO in S20), the constant-pressure operation is continued. On the other hand, when the detected data becomes equal to or less than the first threshold (YES in S20), the constant-pressure operation is shifted to the reduced-pressure operation.

In the reduced-pressure operation, the gasification amount of the liquid hydrogen L1 in the storage tank 10 is reduced by reducing the amount of the liquid hydrogen L1 flowing through the gasification path 20 by the gasification valve 21, and the amount of the hydrogen gas delivered through the gas delivery path 24 from the storage tank 10 is increased by the gas delivery valve 25, thereby reducing the pressure in the storage tank 10 (S30: FIG. 3). Specifically, the control unit 50 (the opening control unit 51) reduces the opening of the gasification valve 21 to reduce the amount of the liquid hydrogen L1 flowing into the gasification path 20 from the storage tank 10, and increases the opening of the gas delivery valve 25. Thereby, the amount of the liquid hydrogen L1 flowing through the heat exchanger 22 is reduced, the amount of hydrogen gasified in the heat exchanger 22 and returned to the storage tank 10 is reduced, and therefore the gasification amount of the liquid hydrogen L1 in the storage tank 10 can be reduced. Moreover, the delivery amount of hydrogen gas from the top space in the storage tank 10 can be increased.

Moreover, in this way, the opening of the gas delivery valve 25 is increased, and the opening of the liquid delivery valve 11 is reduced. Thereby, hydrogen to be delivered in a gas state through the gas delivery path 24 from the top space in the storage tank 10 is increased, and the pressure in the storage tank 10 is reduced.

As mentioned above, by controlling each opening of the gasification valve 21, the gas delivery valve 25 and the liquid delivery valve 11, as shown in FIG. 2, the pressure in the storage tank 10 can be gradually reduced in the reduced-pressure operation.

In this way, by performing the reduced-pressure operation before replenishment of the liquid hydrogen L1 into the storage tank 10, the gasification amount of the liquid hydrogen L1 in the storage tank 10 is reduced and the deliver amount of the hydrogen gas from the top space in the storage tank 10 is increased, thereby capable of further reducing the pressure in the storage tank 10 than the constant-pressure operation. As a result, the suction pressure of the compressor 14 can be reduced than in the constant-pressure operation. Therefore, according to the present method, the pressure in the storage tank 10 can be reduced to the pressure suitable for replenishment of the liquid hydrogen L1 while suppressing the hydrogen amount discharged to the outside of the hydrogen station 1 from the storage tank 10 through the purge path 31. Thus, waste of hydrogen is reduced. In addition, in the reduced-pressure operation, the purge valve 32 may be completely closed, or the purge valve 32 may be opened a little.

Also in the reduced-pressure operation, the liquid amount detection unit 30 continuously detects the remaining amount of the liquid hydrogen L1 in the storage tank 10, and sends the detected data to the control unit 50 (the receiving unit 52). Then, the control unit 50 (the comparison unit 54) determines whether or not the detected data reaches the second threshold (S40: FIG. 3). If the detected data does not reach the second threshold (NO in S40), the reduced-pressure operation is continued. On the other hand, when the detected data becomes equal to or less than the second threshold (YES in S40), the reduced-pressure operation is stopped, and replenishment of the liquid hydrogen L1 into the storage tank 10 is started (S50: FIG. 3). Specifically, the liquid hydrogen L1 is replenished into the storage tank 10 via a replenishment path (not shown) from a tank lorry or the like. Thereby, the liquid level of the liquid hydrogen L1 in the storage tank 10 is raised, and the pressure in the storage tank 10 is raised. Then, the constant-pressure operation and the reduced-pressure operation are repeated again.

Here, the features and the operation and effects of the hydrogen station 1 and the operation method thereof according to the first embodiment described above will be listed.

The hydrogen station 1 according to the present embodiment includes: the storage tank 10 which stores the liquid hydrogen L1; the vaporizer 12 which gasifies the liquid hydrogen L1 supplied from the storage tank 10; the compressor 14 which increases the pressure of the hydrogen gasified in the vaporizer 12 to a predetermined pressure; the gasification path 20 which gasifies at least a part of the liquid hydrogen L1 flowed out of the storage tank 10 by the heat exchanger 22 and returns it to the storage tank 10; the gasification valve 21 which is arranged in the gasification path 20 and adjusts the amount of the liquid hydrogen L1 flowing through the gasification path 20; the gas delivery path 24 for delivering the gasified hydrogen in the storage tank 10 to the path between the vaporizer 12 and the compressor 14, or into the vaporizer 12; the accumulator 15 which stores the hydrogen gas increased in pressure in the compressor 14; the liquid amount detection unit 30 which detects the remaining amount of the liquid hydrogen L1 in the storage tank 10; and the control unit 50 which, when the remaining amount of the liquid hydrogen L1 in the storage tank 10 detected by the liquid amount detection unit 30 becomes equal to or less than the first threshold, controls the gasification valve 21 so as to reduce the amount of the liquid hydrogen L1 flowing through the gasification path 20 and reduce the gasification amount of the liquid hydrogen L1 in the storage tank 10, and further controls the gas delivery valve 25 arranged in the gas delivery path 24 so as to increase the amount of hydrogen gas delivered through the gas delivery path 24 from the storage tank 10. Among the hydrogen gas (the hydrogen gas supplied to the demander) flowing through the second path 41, the ratio of the hydrogen gas (the hydrogen gas delivered from the top space in the storage tank 10) flowing into the second path 41 from the gas delivery path 24 may be larger than the ratio of the hydrogen gas flowing into the second path 41 from the vaporizer 12.

The hydrogen station operation method according to the present embodiment is a method for replenishing the liquid hydrogen L1 into the storage tank 10 in the hydrogen station 1 described above. In the method, when the remaining amount of the liquid hydrogen L1 in the storage tank 10 becomes equal to or less than the first threshold before replenishing the liquid hydrogen L1 into the storage tank 10, by reducing the amount of the liquid hydrogen L1 flowing through the gasification path 20 by the gasification valve 21 arranged in the gasification path 20, reducing the gasification amount of the liquid hydrogen L1 in the storage tank 10, and further increasing the amount of hydrogen gas delivered through the gas delivery path 24 from the storage tank 10 by the gas delivery valve 25 arranged in the gas delivery path 24, the pressure in the storage tank 10 is reduced, thereby performing the operation in which the suction pressure of the compressor 14 is reduced.

According to the feature, when the remaining amount of the liquid hydrogen L1 in the storage tank 10 becomes equal to or less than the first threshold, by reducing the amount of the liquid hydrogen L1 flowing through the gasification path 20 by the gasification valve 21 to reduce the gasification amount of the liquid hydrogen L1 in the storage tank 10, and increasing the delivery amount of hydrogen gas from the top space in the storage tank 10, it is possible to reduce the pressure in the storage tank 10 before replenishment of the liquid hydrogen L1. Therefore, unlike in the case where the pressure in the storage tank 10 is reduced only by discharging hydrogen gas in the storage tank 10 to the outside of the hydrogen station 1, the pressure in the storage tank 10 can be reduced to the pressure suitable for replenishment of the liquid hydrogen L1 while suppressing the amount of hydrogen gas discharged to the outside of the hydrogen station 1 from the storage tank 10. Thereby, it is possible to efficiently replenish the liquid hydrogen L1 into the storage tank 10 while cutting waste of hydrogen.

In the hydrogen station 1, the gasification path 20 includes the heat exchanger 22 which gasifies the liquid hydrogen L1 by the heat of heat source fluid. In the hydrogen station operation method, when the remaining amount of the liquid hydrogen L1 in the storage tank 10 becomes equal to or less than the first threshold before replenishing the liquid hydrogen L1 into the storage tank 10, the amount of the liquid hydrogen L1 flowing through the heat exchanger 22 is reduced by the gasification valve 21.

Thereby, by reducing the amount of the liquid hydrogen L1 flowing through the heat exchanger 22, the amount of hydrogen gas returned to the storage tank 10 can be reduced. As a result, the gasification amount of the liquid hydrogen L1 in the storage tank 10 is reduced, and the pressure in the storage tank 10 can be easily reduced to the pressure suitable for replenishment of the liquid hydrogen L1. Further, by controlling the gas delivery valve 25 and the liquid delivery valve 11 in such a manner that the delivery amount of hydrogen gas from the top space in the storage tank 10 is increased, the pressure in the storage tank 10 can be surely reduced.

In the hydrogen station 1, the control unit 50 controls the gasification valve 21, the gas delivery valve 25 and the liquid delivery valve 11 in such a manner that the pressure in the storage tank 10 is gradually reduced until the remaining amount of the liquid hydrogen L1 in the storage tank 10 detected by the liquid amount detection unit 30 reaches the second threshold which is a value smaller than the first threshold and which requires replenishment of the liquid hydrogen L1 from the first threshold. In the hydrogen station operation method, until the remaining amount of the liquid hydrogen L1 in the storage tank 10 reaches the second threshold smaller than the first threshold from the first threshold, by gradually reducing the gasification amount of the liquid hydrogen L1 in the storage tank 10 and increasing the delivery amount of hydrogen gas from the top space in the storage tank 10, the pressure in the storage tank 10 is gradually reduced. Then, based on the fact that the remaining amount of the liquid hydrogen L1 in the storage tank 10 reached the second threshold, replenishment of the liquid hydrogen L1 into the storage tank 10 is started.

Thereby, before replenishment of the liquid hydrogen L1 into the storage tank 10 is required (before the remaining amount of the liquid hydrogen L1 in the storage tank 10 reaches the second threshold), the pressure in the storage tank 10 can be gradually reduced. Thereby, at the time when the remaining amount of the liquid hydrogen L1 in the storage tank 10 reaches the second threshold, the pressure in the storage tank 10 can be in a state of being reduced enough to perform replenishment of the liquid hydrogen L1, and therefore it is possible to immediately perform replenishment of the liquid hydrogen L1.

Other Embodiments

Finally, other embodiments of the present invention will be described.

In the first embodiment, the case where the remaining amount of the liquid hydrogen L1 in the storage tank 10 is detected by a sensor (the liquid amount detection unit 30) and each opening of the gasification valve 21, the gas delivery valve 25 and the liquid delivery valve 11 is automatically controlled in relation to the detection result has been described, but the present invention is not limited thereto. For example, an operator may check the remaining amount of the liquid hydrogen L1 in the storage tank 10, and manually control each opening of the gasification valve 21, the gas delivery valve 25 and the liquid delivery valve 11 at the timing when the remaining amount becomes equal to or less than the first threshold.

In the first embodiment, the case where the pressure in the storage tank 10 is gradually reduced in the reduced-pressure operation has been described, but the present invention is not limited thereto. Even though the remaining amount of the liquid hydrogen L1 in the storage tank 10 is reduced in the reduced-pressure operation, the time during which the pressure in the storage tank 10 is maintained constant may exist.

In the first embodiment, a plurality of the dispensers may be provided so as to be able to fill each of the FC forklift and the FC vehicle (the tank loading devices) with hydrogen gas. For example, in FIG. 1, the first dispenser 16A may have a nozzle corresponding to a refueling port of the FC forklift, and the second dispenser 16B may have a nozzle corresponding to a refueling port of the FC vehicle.

In the first embodiment, the gasification path 20 and the gasification valve 21 may be omitted.

It should be noted that the embodiments disclosed herein are to be considered in all the respects as illustrative and not restrictive. The scope of the present invention is indicated not by the aforementioned description but by the claims, and it is intended that all changes within the equivalent meaning and scope to the claims may be included therein.

What is claimed is:

1. A hydrogen station operation method for replenishing liquid hydrogen into a storage tank, the method comprising:
    providing a hydrogen station which includes the storage tank which stores the liquid hydrogen; a vaporizer which gasifies the liquid hydrogen supplied from the storage tank; a compressor which increases the pressure of the hydrogen gasified in the vaporizer to a predetermined pressure; a gasification path which gasifies at least a part of the liquid hydrogen flowed out of the storage tank and returns it to the storage tank; a gas delivery path for delivering the gasified hydrogen in the storage tank to a path between the vaporizer and the compressor, or into the vaporizer; and an accumulator which stores the hydrogen gas increased in pressure in the compressor, for filling a tank loading device with the hydrogen gas stored in the accumulator via a dispenser;
    determining that the remaining amount of the liquid hydrogen in the storage tank is equal to or less than a first threshold; and
    after determining that the remaining amount of the liquid hydrogen in the storage tank is equal to or less than the first threshold, reducing the pressure in the storage tank to a pressure suitable for replenishing the liquid hydrogen into the storage tank and reducing a suction pressure of the compressor, by:
        reducing the amount of the liquid hydrogen flowing through the gasification path by a valve arranged in the gasification path,
        reducing the gasification amount of the liquid hydrogen in the storage tank, and
        further increasing the amount of hydrogen gas delivered through the gas delivery path from the storage tank by a valve arranged in the gas delivery path.

2. The hydrogen station operation method according to claim 1, wherein
    until the remaining amount of the liquid hydrogen in the storage tank reaches a second threshold smaller than the first threshold from the first threshold, the pressure in the storage tank is gradually reduced, and
    based on the fact that the remaining amount of the liquid hydrogen in the storage tank reached the second threshold, replenishment of the liquid hydrogen into the storage tank is started.

3. The hydrogen station operation method according to claim 1, wherein the tank loading device is a fuel cell forklift or a fuel cell vehicle.

4. The hydrogen station operation method according to claim 3, wherein in the hydrogen station, a plurality of the dispensers are provided so as to be able to fill each of the fuel cell forklift and the fuel cell vehicle with hydrogen gas.

5. A hydrogen station comprising:
    a storage tank which stores liquid hydrogen;
    a vaporizer which gasifies the liquid hydrogen supplied from the storage tank;
    a compressor which increases the pressure of the hydrogen gasified in the vaporizer to a predetermined pressure;
    a gasification path which gasifies at least a part of the liquid hydrogen flowed out of the storage tank and returns it to the storage tank;
    a gasification valve which is arranged in the gasification path and adjusts the amount of the liquid hydrogen flowing through the gasification path;
    a gas delivery path for delivering the gasified hydrogen in the storage tank to a path between the vaporizer and the compressor, or into the vaporizer;
    an accumulator which stores the hydrogen gas increased in pressure in the compressor;
    a level sensor which detects the remaining amount of the liquid hydrogen in the storage tank; and
    a control unit which, when the remaining amount of the liquid hydrogen in the storage tank detected by the liquid amount detection unit becomes equal to or less than a first threshold, reduces the pressure in the storage tank to a pressure suitable for replenishing the liquid hydrogen into the storage tank by controlling the gasification valve so as to reduce the amount of the liquid hydrogen flowing through the gasification path and reduce the gasification amount of the liquid hydrogen in the storage tank, and further controlling a valve arranged in the gas delivery path so as to increase the amount of hydrogen gas delivered through the gas delivery path from the storage tank.

6. The hydrogen station according to claim 5, wherein the control unit controls the gasification valve in such a manner that the pressure in the storage tank is gradually reduced until the remaining amount of the liquid hydrogen in the storage tank detected by the liquid amount detection unit reaches a second threshold which is a value smaller than the first threshold and which requires replenishment of the liquid hydrogen from the first threshold.

7. The hydrogen station according to claim 5, further comprising a plurality of dispensers for filling tank loading devices with hydrogen gas stored in the accumulator, provided so as to be able to fill each of a fuel cell forklift and a fuel cell vehicle which are the tank loading devices with hydrogen gas.

* * * * *